US011910328B2

(12) United States Patent
Abotabl et al.

(10) Patent No.: US 11,910,328 B2
(45) Date of Patent: Feb. 20, 2024

(54) APPLYING AMPLITUDE DROOPING FOR ADJACENT BANDS

(71) Applicant: QUALCOMM Incorporated, San Diego, CA (US)

(72) Inventors: Ahmed Attia Abotabl, San Diego, CA (US); Muhammad Sayed Khairy Abdelghaffar, San Jose, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 208 days.

(21) Appl. No.: 17/305,204

(22) Filed: Jul. 1, 2021

(65) Prior Publication Data

US 2023/0007595 A1 Jan. 5, 2023

(51) Int. Cl.
*H04W 52/24* (2009.01)
*H04L 5/14* (2006.01)
*H04W 72/04* (2023.01)
*H04W 72/23* (2023.01)

(52) U.S. Cl.
CPC ............ *H04W 52/243* (2013.01); *H04L 5/14* (2013.01); *H04W 72/23* (2023.01)

(58) Field of Classification Search
CPC . H04W 52/243; H04W 72/23; H04W 52/247; H04W 52/146; H04L 5/14; H04L 5/001; H04L 5/0058; H04L 5/0062; H04B 17/318

See application file for complete search history.

(56) References Cited

U.S. PATENT DOCUMENTS

| 10,110,364 | B2 * | 10/2018 | Kim | H04W 72/23 |
| 11,456,765 | B2 * | 9/2022 | Kim | H04B 1/0475 |
| 2005/0272367 | A1 * | 12/2005 | Rodgers | H04B 7/2606 455/296 |
| 2016/0198475 | A1 * | 7/2016 | Uchiyama | H04W 52/46 370/329 |
| 2016/0285486 | A1 * | 9/2016 | Qin | H04B 1/123 |
| 2017/0019272 | A1 * | 1/2017 | Brannon | H04L 5/14 |
| 2017/0302337 | A1 * | 10/2017 | Liu | H04L 5/0092 |
| 2018/0083744 | A1 * | 3/2018 | Kim | H04L 5/005 |
| 2018/0248677 | A1 * | 8/2018 | Lee | H04L 5/0062 |
| 2018/0287739 | A1 * | 10/2018 | Kim | H04J 11/0023 |
| 2020/0067690 | A1 * | 2/2020 | Park | H04W 72/0453 |
| 2020/0389805 | A1 * | 12/2020 | Kim | H04L 1/0027 |
| 2020/0412519 | A1 * | 12/2020 | Krishnaswamy | H04B 1/44 |
| 2021/0021399 | A1 * | 1/2021 | Liu | H04W 52/04 |
| 2022/0159580 | A1 * | 5/2022 | Su | H04W 52/367 |

* cited by examiner

*Primary Examiner* — Hoang-Chuong Q Vu
(74) *Attorney, Agent, or Firm* — Harrity & Harrity LLP/Qualcomm Incorporated

(57) ABSTRACT

Various aspects of the present disclosure generally relate to wireless communication. In some aspects, a user equipment (UE) may receive, from a base station via the transceiver, an indication to apply an amplitude drooping based at least in part on an uplink band being adjacent to a downlink band in a full-duplex operation. The UE may transmit, to the base station via the transceiver, an uplink transmission in the uplink band based at least in part on the amplitude drooping. Numerous other aspects are described.

30 Claims, 13 Drawing Sheets

APPLYING AMPLITUDE DROOPING FOR ADJACENT BANDS

FIELD OF THE DISCLOSURE

Aspects of the present disclosure generally relate to wireless communication and to techniques and apparatuses for applying amplitude drooping for adjacent bands.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some implementations, an apparatus for wireless communication at a user equipment (UE) includes a memory; a transceiver; and one or more processors, coupled to the memory, configured to: receive, from a base station via the transceiver, an indication to apply an amplitude drooping based at least in part on an uplink band being adjacent to a downlink band in a full-duplex operation; and transmit, to the base station via the transceiver, an uplink transmission in the uplink band based at least in part on the amplitude drooping.

In some implementations, an apparatus for wireless communication at a base station includes a memory; a transceiver; and one or more processors, coupled to the memory, configured to: transmit, to a UE via the transceiver, an indication to apply an amplitude drooping based at least in part on an uplink band being adjacent to a downlink band in a full-duplex operation; and receive, from the UE via the transceiver, an uplink transmission in the uplink band based at least in part on the amplitude drooping.

In some implementations, a method of wireless communication performed by a UE includes receiving, from a base station, an indication to apply an amplitude drooping based at least in part on an uplink band being adjacent to a downlink band in a full-duplex operation; and transmitting, to the base station, an uplink transmission in the uplink band based at least in part on the amplitude drooping.

In some implementations, a method of wireless communication performed by a base station includes transmitting, to a UE, an indication to apply an amplitude drooping based at least in part on an uplink band being adjacent to a downlink band in a full-duplex operation; and receiving, from the UE, an uplink transmission in the uplink band based at least in part on the amplitude drooping.

In some implementations, a non-transitory computer-readable medium storing a set of instructions for wireless communication includes one or more instructions that, when executed by one or more processors of a UE, cause the UE to: receive, from a base station, an indication to apply an amplitude drooping based at least in part on an uplink band being adjacent to a downlink band in a full-duplex operation; and transmit, to the base station, an uplink transmission in the uplink band based at least in part on the amplitude drooping.

In some implementations, a non-transitory computer-readable medium storing a set of instructions for wireless communication includes one or more instructions that, when executed by one or more processors of a base station, cause the base station to: transmit, to a UE, an indication to apply an amplitude drooping based at least in part on an uplink band being adjacent to a downlink band in a full-duplex operation; and receive, from the UE, an uplink transmission in the uplink band based at least in part on the amplitude drooping.

In some implementations, an apparatus for wireless communication includes means for receiving, from a base station, an indication to apply an amplitude drooping based at least in part on an uplink band being adjacent to a downlink band in a full-duplex operation; and means for transmitting, to the base station, an uplink transmission in the uplink band based at least in part on the amplitude drooping.

In some implementations, an apparatus for wireless communication includes means for transmitting, to a UE, an indication to apply an amplitude drooping based at least in part on an uplink band being adjacent to a downlink band in a full-duplex operation; and means for receiving, from the UE, an uplink transmission in the uplink band based at least in part on the amplitude drooping.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
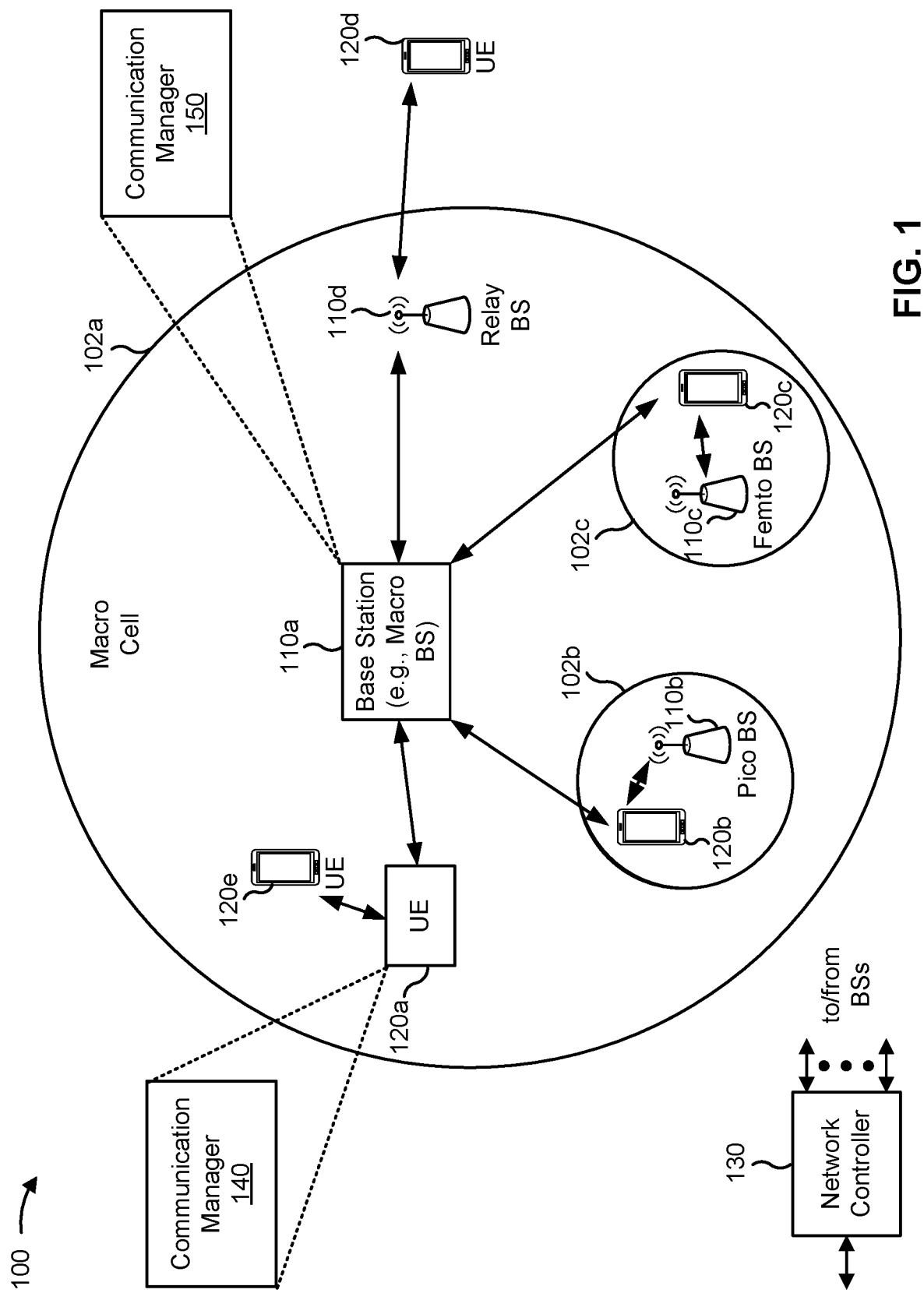
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a UE (e.g., UE 120) may include a communication manager 140. As described in more detail elsewhere herein, the communication manager 140 may receive, from a base station, an indication to apply an amplitude drooping based at least in part on an uplink band being adjacent to a downlink band in a full-duplex operation; and transmit, to the base station, an uplink transmission in the uplink band based at least in part on the amplitude drooping. Additionally, or alternatively, the communication manager 140 may perform one or more other operations described herein.

In some aspects, a base station (e.g., base station 110) may include a communication manager 150. As described in more detail elsewhere herein, the communication manager 150 may transmit, to a UE, an indication to apply an amplitude drooping based at least in part on an uplink band being adjacent to a downlink band in a full-duplex operation; and receive, from the UE, an uplink transmission in the uplink band based at least in part on the amplitude drooping. Additionally, or alternatively, the communication manager 150 may perform one or more other operations described herein.

As indicated above, FIG. 1 is provided as an example. Other examples may differ from what is described with regard to FIG. 1.

Figure 2:
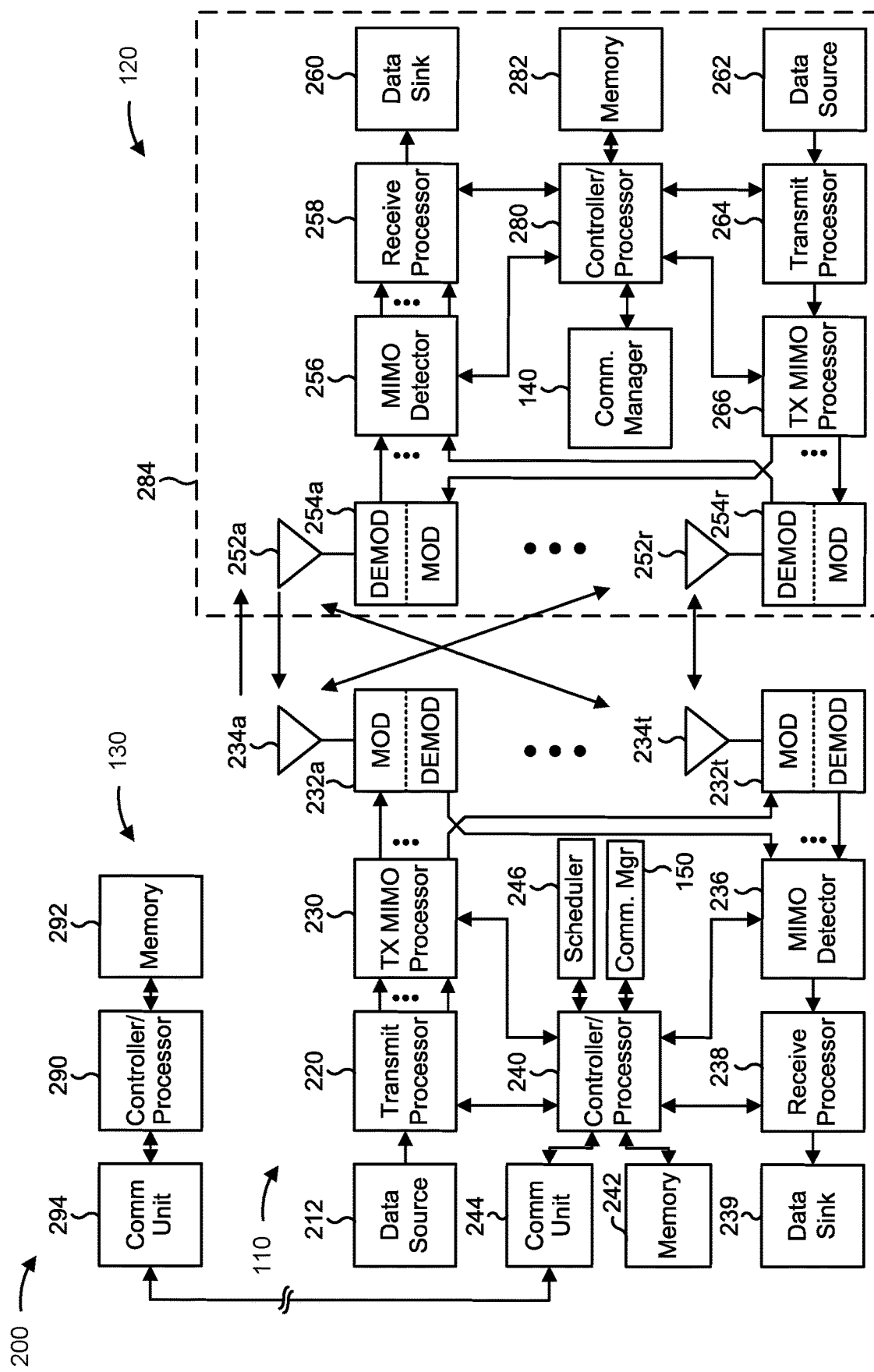
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The UE 120 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 9-11).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 9-11).

The controller/processor 240 of the base station 110, the controller/processor 280 of the UE 120, and/or any other component(s) of FIG. 2 may perform one or more techniques associated with applying amplitude drooping for adjacent bands, as described in more detail elsewhere herein. For example, the controller/processor 240 of the base station 110, the controller/processor 280 of the UE 120, and/or any other component(s) of FIG. 2 may perform or direct operations of, for example, process 1000 of FIG. 10, process 1100 of FIG. 11, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1000 of FIG. 10, process 1100 of FIG. 11, and/or other processes as described herein. In some examples, executing instructions may include running the instructions, converting the instructions, compiling the instructions, and/or interpreting the instructions, among other examples.

In some aspects, a UE (e.g., UE 120) includes means for receiving, from a base station, an indication to apply an amplitude drooping based at least in part on an uplink band being adjacent to a downlink band in a full-duplex operation (e.g., using antenna 252, modem 254, MIMO detector 256, receive processor 258, controller/processor 280, and/or memory 282); and/or means for transmitting, to the base station, an uplink transmission in the uplink band based at least in part on the amplitude drooping (e.g., using controller/processor 280, transmit processor 264, TX MIMO processor 266, modem 254, antenna 252, and/or memory 282). The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a base station (e.g., base station 110) includes means for transmitting, to a UE, an indication to apply an amplitude drooping based at least in part on an uplink band being adjacent to a downlink band in a full-duplex operation (using controller/processor 240, transmit processor 220, TX MIMO processor 230, modem 232, antenna 234, and/or memory 242); and/or means for receiving, from the UE, an uplink transmission in the uplink band based at least in part on the amplitude drooping (e.g., using antenna 234, modem 232, MIMO detector 236, receive processor 238, controller/processor 240, and/or memory 242). The means for the base station to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
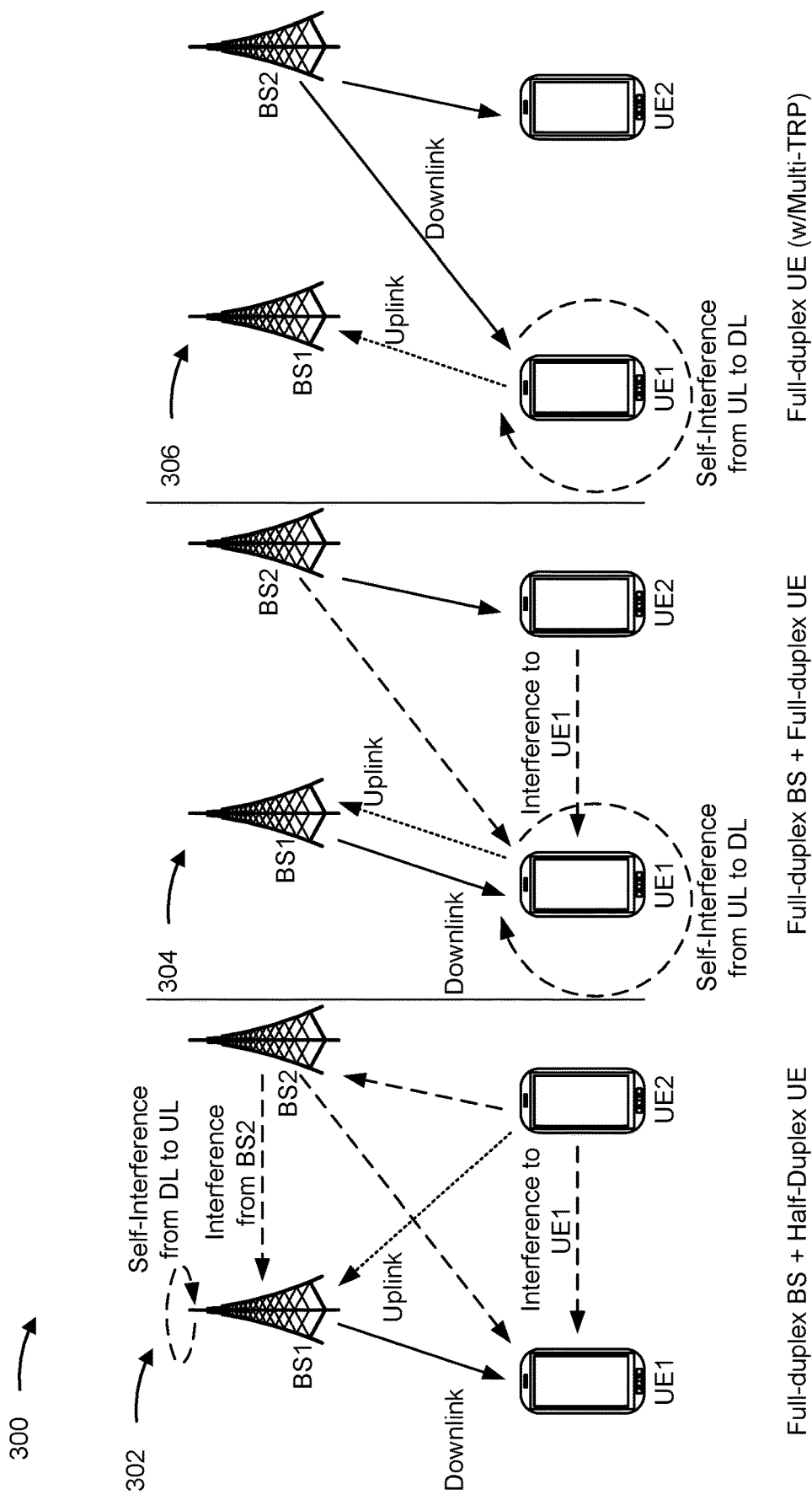
FIG. 3 is a diagram illustrating an example of full-duplex communication modes, in accordance with the present disclosure.

FIG. 3 is a diagram illustrating an example 300 of full-duplex communication modes. As shown by reference number 302, a first base station and a second base station may be full-duplex base stations. A first UE and a second UE may be half duplex UEs. The first base station may perform downlink transmissions to the first UE, and the first base station may receive uplink transmissions from the second UE. The first base station may experience self-interference from a downlink to an uplink based at least in part on the downlink transmissions to the first UE and the uplink transmissions received from the second UE. The first base station may experience interference from the second base station. The first UE may experience interference from the second base station and the second UE.

As shown by reference number 304, a first base station and a second base station may be full-duplex base stations. A first UE and a second UE may be full-duplex UEs. The first base station may perform downlink transmissions to the first UE, and the first base station may receive uplink transmissions from the first UE. The first UE may experience self-interference from an uplink to a downlink based at least in part on the downlink transmissions from the first base station and the uplink transmissions to the first base station. The first UE may experience interference from the second base station and the second UE.

As shown by reference number 306, a first UE and a second UE may be full-duplex UEs and may communicate in a multi-TRP configuration. A first base station may receive uplink transmissions from the first UE, and a second base station may perform downlink transmissions to the first UE and the second UE. The first UE may experience self-interference from an uplink to a downlink based at least in part on the uplink transmissions to the first base station and the downlink transmissions from the second base station.

As indicated above, FIG. 3 is provided as an example. Other examples may differ from what is described with regard to FIG. 3.

Figure 4:
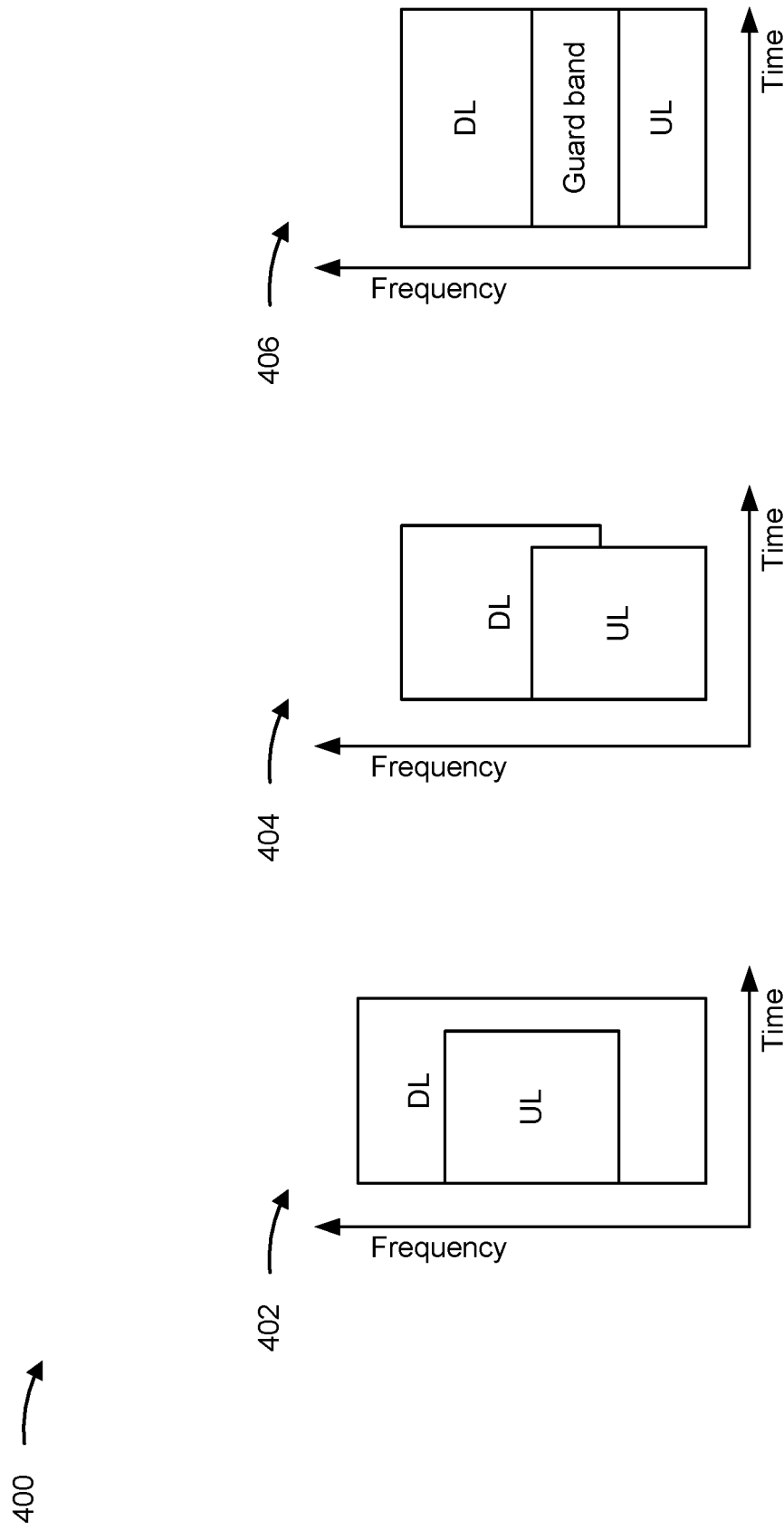
FIG. 4 is a diagram illustrating examples of full-duplex communication, in accordance with the present disclosure.

FIG. 4 is a diagram illustrating examples 400 of full-duplex communication. A UE may operate in an in-band full-duplex mode. In the in-band full-duplex mode, the UE may transmit and receive on a same time and frequency resource. An uplink and a downlink may share the same time and frequency resource. For example, as shown by reference number 402, a time and frequency resource for the uplink may fully overlap with a time and frequency resource for the downlink. As another example, as shown by reference number 404, a time and frequency resource for the uplink may partially overlap with a time and frequency resource for the downlink.

A UE may operate in a sub-band frequency division duplex mode (or a flexible duplex mode). In the sub-band frequency division duplex mode, the UE may transmit and receive at a same time, but the UE may transmit and receive on a different frequency resource. For example, as shown by reference number 406, a downlink resource may be separated from an uplink resource by a guard band in a frequency domain.

As indicated above, FIG. 4 is provided as an example. Other examples may differ from what is described with regard to FIG. 4.

Figure 5:
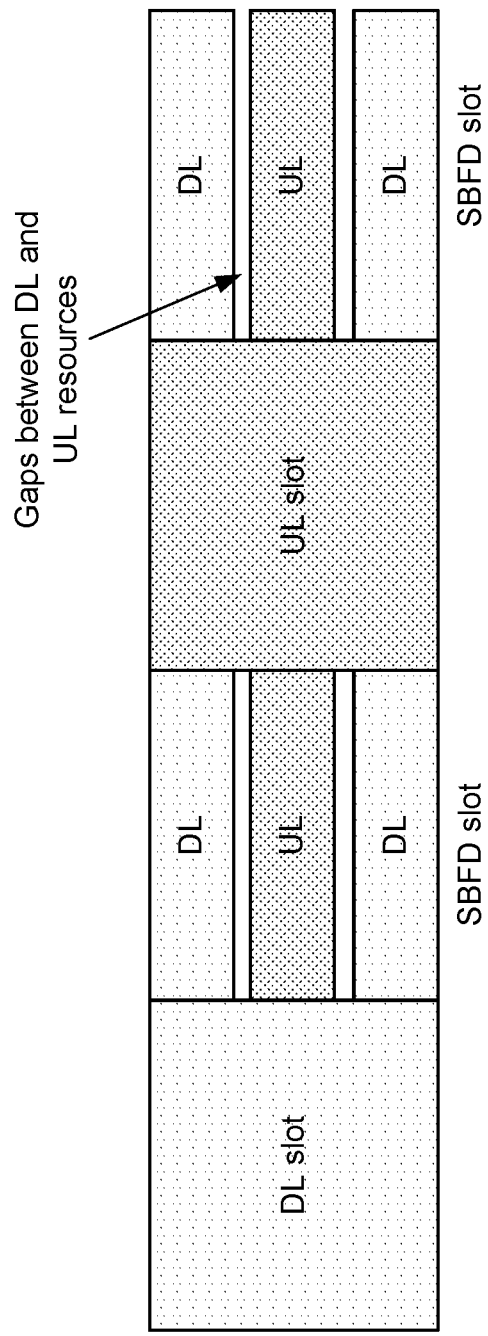
FIG. 5 is a diagram illustrating an example of a sub-band full-duplex (SBFD) slot, in accordance with the present disclosure.

FIG. 5 is a diagram illustrating an example 500 of an SBFD slot, in accordance with the present disclosure.

As shown in FIG. 5, a slot configuration may include a combination of downlink slots, uplink slots, and/or SBFD slots. An SBFD slot may include one or more downlink resources and one or more uplink resources. A downlink resource in the SBFD slot may be separated (e.g., in time and/or frequency) from an uplink resource in the SBFD slot by a gap, which may function to reduce self-interference and improve latency and uplink coverage.

As indicated above, FIG. 5 is provided as an example. Other examples may differ from what is described with respect to FIG. 5.

Figure 6:
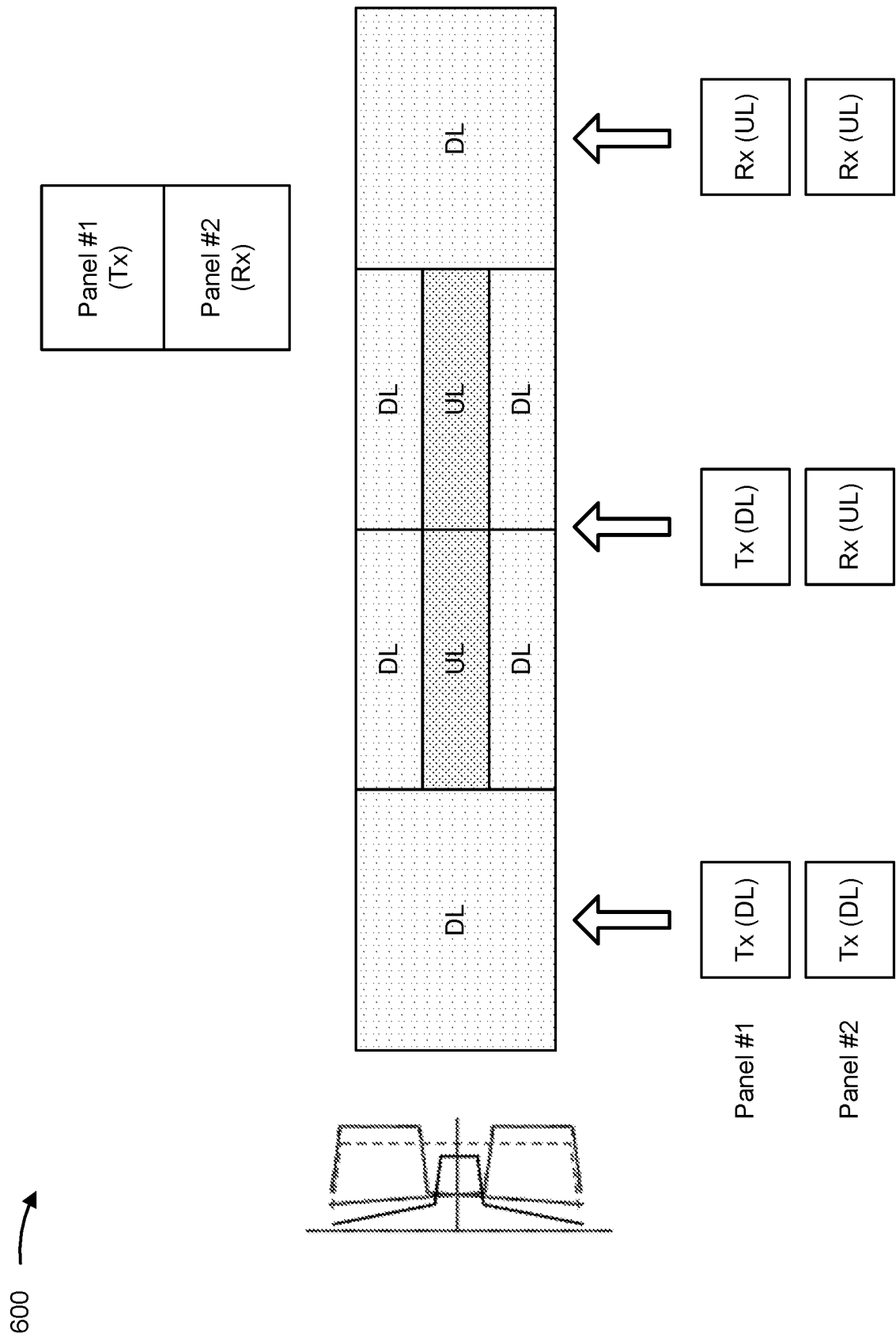
FIG. 6 is a diagram illustrating an example of separate panels for simultaneous transmit and receive operations, in accordance with the present disclosure.

FIG. 6 is a diagram illustrating an example 600 of separate panels for simultaneous transmit and receive operations, in accordance with the present disclosure.

A base station may include two separate panels for simultaneous transmit and receive operations. A first panel may be associated with downlink transmission at both edges of a band. A second panel may be associated with uplink reception at a middle of the band. The two separate panels may mitigate self-interference by improving an amount of isolation (e.g., more than 50 dB) between an uplink and a downlink.

As an example, a first slot may be associated with a downlink. For the first slot, the first panel may be associated with a downlink, and the second panel may be associated with a downlink A second slot may be associated with both a downlink and an uplink. For the second slot, the first panel may be associated with a downlink, and the second panel may be associated with an uplink. A third slot may be associated with both a downlink and an uplink. For the third slot, the first panel may be associated with a downlink, and the second panel may be associated with an uplink. The second and third slots may be SBFD slots. A fourth slot may be associated with an uplink. For the fourth slot, the first panel may be associated with an uplink, and the second panel may be associated with an uplink.

A power spectrum density of a downlink signal and an uplink signal in an SBFD slot may indicate a presence of leakage from an uplink to a downlink, and a presence of leakage from the downlink to the uplink. The power spectrum density may indicate a presence of self-interference from the downlink and the uplink, even though the downlink and the uplink are not overlapping in frequency.

An SBFD slot may be associated with an uplink and a downlink in different portions of a band, with a guard band between the uplink and the downlink. The SBFD slot may provide an amount of isolation (e.g., more than 40 dB) between the uplink and the downlink, which may improve self-interference.

As indicated above, FIG. 6 is provided as an example. Other examples may differ from what is described with respect to FIG. 6.

An amplitude droop, measured in dB, may be a measure of an amount that a signal power falls from a start of a specified measurement window. The amplitude droop may occur due to radio frequency (RF) filtering, which may involve passing signals through mixers, duplexers, and/or diplexers. The amplitude droop may occur due to a digitalto-analog converter (DAC) frequency response and/or an analog-to-digital converter (ADC) frequency response. The amplitude droop may be a challenge for both transmit and receive processing including signal transmission and reception, as a base station may expect a constant signal power over a frequency range.

Figure 7:
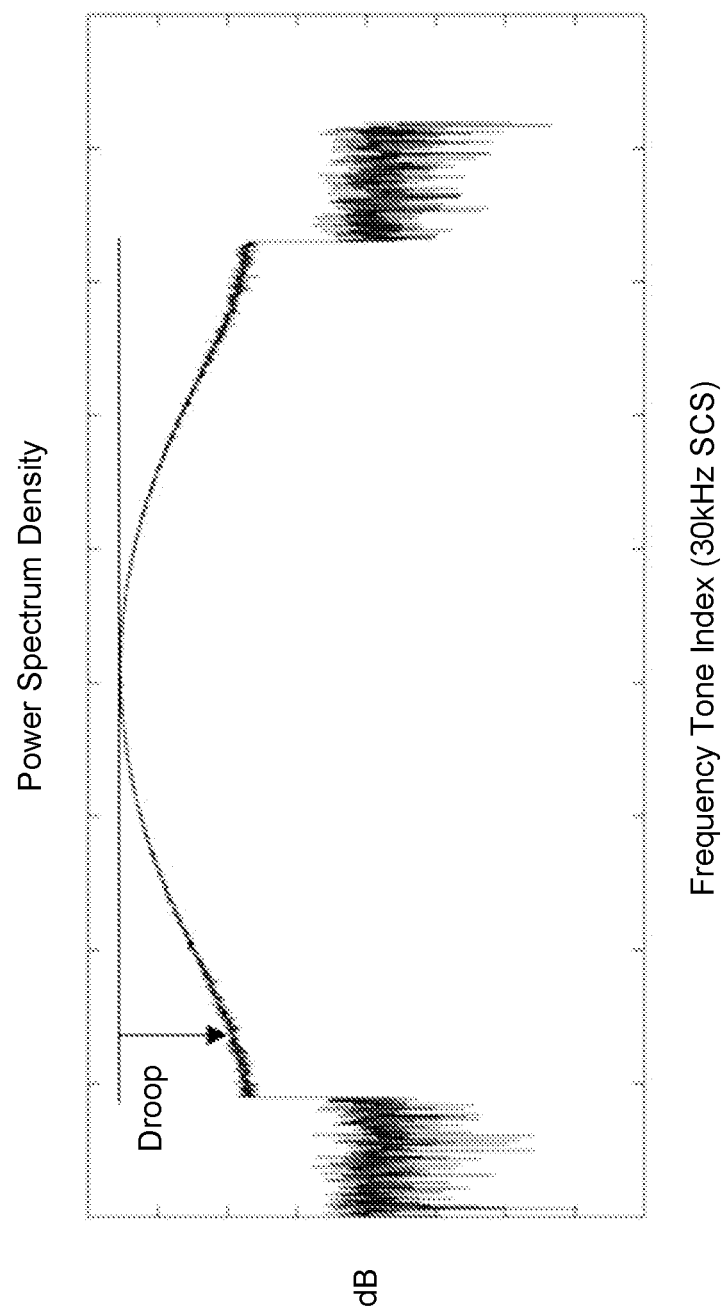
FIG. 7 is a diagram illustrating an example of an amplitude droop effect, in accordance with the present disclosure.

FIG. 7 is a diagram illustrating an example 700 of an amplitude droop effect, in accordance with the present disclosure.

A power spectrum density of a signal over a period of time may indicate an amplitude droop. The amplitude droop (in dB) may refer to a measure of an amount of power change of the signal from a start of a specified measurement window. The amplitude droop may occur at a beginning and/or at an end of the specified measurement window, due to RF filtering and/or a DAC/ADC frequency response. Generally, the amplitude droop may be undesirable since a base station expects a constant signal power over a frequency range.

As indicated above, FIG. 7 is provided as an example. Other examples may differ from what is described with respect to FIG. 7.

Figure 8:
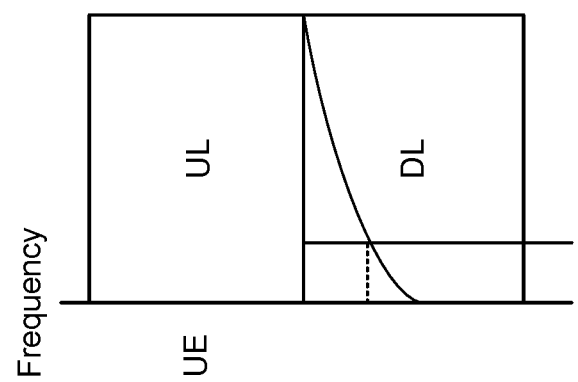
FIG. 8 is a diagram illustrating an example of a leakage from an uplink to a downlink, in accordance with the present disclosure.

FIG. 8 is a diagram illustrating an example 800 of a leakage from an uplink to a downlink, in accordance with the present disclosure.

In this schematic illustration of leakage from uplink to downlink, a curve illustrating increasing interference—where a measure of interference is increasing on a y-axis and a measure of uplink transmit power is increasing along an x-axis—is superimposed on schematic blocks showing an uplink band and a downlink band with frequency increasing on the y-axis. The curved line illustrates increasing interference of the uplink transmission with downlink reception (e.g., leakage from uplink into downlink) as uplink transmit power increases. Below some interference threshold, illustrated here as a dotted line, uplink and downlink may be adjacent to each other, but above the interference threshold, interference may degrade performance and a guard band separating the uplink and downlink may be useful. Where the dotted line interference threshold intersects the curved line, the vertical line indicates a corresponding uplink power below which interference may be small enough so that no guard band is used.

An SBFD slot may be associated with an uplink band and a downlink band, wherein the downlink band may be adjacent to the uplink band. The downlink band may be spectrally adjacent to the uplink band. The uplink band may be associated with a first bandwidth, and the downlink band may be associated with a second bandwidth. A leakage may occur from an uplink to a downlink, which may cause self-interference on the downlink, as shown by the curved line in FIG. 8. When a UE is performing an uplink transmission to a base station, the leakage that occurs from the uplink to the downlink may cause self-interference when the UE is receiving a downlink transmission from the base station. The leakage may be based at least in part on a beam associated with the uplink and/or a power spectrum density associated with the uplink. When the UE is performing the uplink transmission, a lower power associated with the uplink transmission may correspond to a lower leakage, and thereby a lower amount of self-interference on the downlink, as shown by the curved line in FIG. 8.

The SBFD slot may be associated with an uplink transmission in a middle of the uplink band and a downlink reception at an edge of the downlink band. A downlink reception may be most affected by tones of the uplink band that are closest to the downlink band (e.g., edges of the uplink band). In other words, the tones closest to the downlink band, such as the edges of the uplink band, may primarily cause the self-interference on the downlink band. In this case, amplitude drooping may help reduce self-interference at the UE by applying amplitude drooping to uplink transmissions to reduce leakage from uplink to downlink.

As indicated above, FIG. 8 is provided as an example. Other examples may differ from what is described with respect to FIG. 8.

Full-duplex communications may allow a base station and a UE to transmit and receive on a same set of resources, thereby providing essentially twice as much bandwidth as half-duplex communications in which only a base station or a UE is allowed to transmit or receive on a set of resources. However, full-duplex communications may be associated with self-interference between a downlink transmission and an uplink transmission. Self-interference may be an issue even with various self-interference mitigation techniques, such as separate panels for simultaneous transmit and receive operations, and/or using SBFD slots where a downlink and an uplink are associated with different portions of an SBFD slot. The self-interference may arise in an SBFD slot when tones closest to a downlink band, such as edges of an uplink band, cause the self-interference on the downlink band. Tones associated with the edges of the uplink band may cause a leakage from the uplink band to the downlink band, which may cause the self-interference on the downlink band.

In various aspects of techniques and apparatuses described herein, a UE may receive, from a base station, an indication for the UE to apply an amplitude drooping. The UE may apply the amplitude drooping when an uplink band is adjacent to a downlink band in a full-duplex operation. The amplitude drooping may be associated with a change in signal power within a specified measurement window. The UE may apply the amplitude drooping by adjusting one or more coefficients associated with an RF filtering that is applied to a signal associated with an uplink transmission. The UE may adjust the one or more coefficients associated with the RF filtering to increase or decrease the amplitude drooping. The UE may transmit, to the base station, the uplink transmission in the uplink band based at least in part on the amplitude drooping. The UE may transmit the uplink transmission with the amplitude drooping to reduce a self-interference at the UE for a downlink reception in the downlink band that is adjacent to the uplink band. As a result, by intentionally adjusting the amplitude drooping for the full-duplex operation, the uplink transmission may not cause the self-interference on the downlink reception in the downlink band.

Amplitude drooping is generally not desirable, so intentionally adjusting the amplitude drooping for the purpose of reducing the self-interference in the full-duplex operation is not obvious in view of typical approaches that attempt to reduce the amplitude drooping. Amplitude drooping is a phenomenon that has previously been the subject of many attempts to eliminate due to its otherwise detrimental affect on signal quality.

In some aspects, the UE may exploit amplitude drooping (e.g., via RF filtering) for an uplink transmission to reduce self-interference to neighboring resource blocks in a downlink band in a full-duplex operation. In some aspects, the UE may report to the base station multiple amplitude drooping values that may be applied at the UE. The UE may report the multiple amplitude drooping values via uplink control information (UCI), a physical uplink shared channel (PUSCH), capability reporting, and/or UE assistance information. The base station may indicate to the UE, via layer 1 signaling or layer 2 signaling or semi-static signaling, which amplitude drooping value for the UE to apply. In some aspects, the UE may autonomously apply the amplitude drooping based at least in part on a current guard band between an uplink and a downlink.

In some aspects, amplitude drooping may be shared between the base station and the network. Rather than the UE minimizing an amount of amplitude drooping, as in previous solutions, the base station may indicate to the UE to only compensate for a certain amount of amplitude drooping. In other words, the base station may effectively indicate to the UE to allow and/or create a certain amount of amplitude drooping for self-interference mitigation. The indication received from the base station may indicate an amplitude drooping value, where a relatively low amplitude drooping value may represent a relatively low level of amplitude drooping and a relatively high amplitude drooping value may represent a relatively high level of amplitude drooping. As a result, the UE may compensate for some amplitude drooping, and the base station may compensate for some amplitude drooping.

Figure 9:
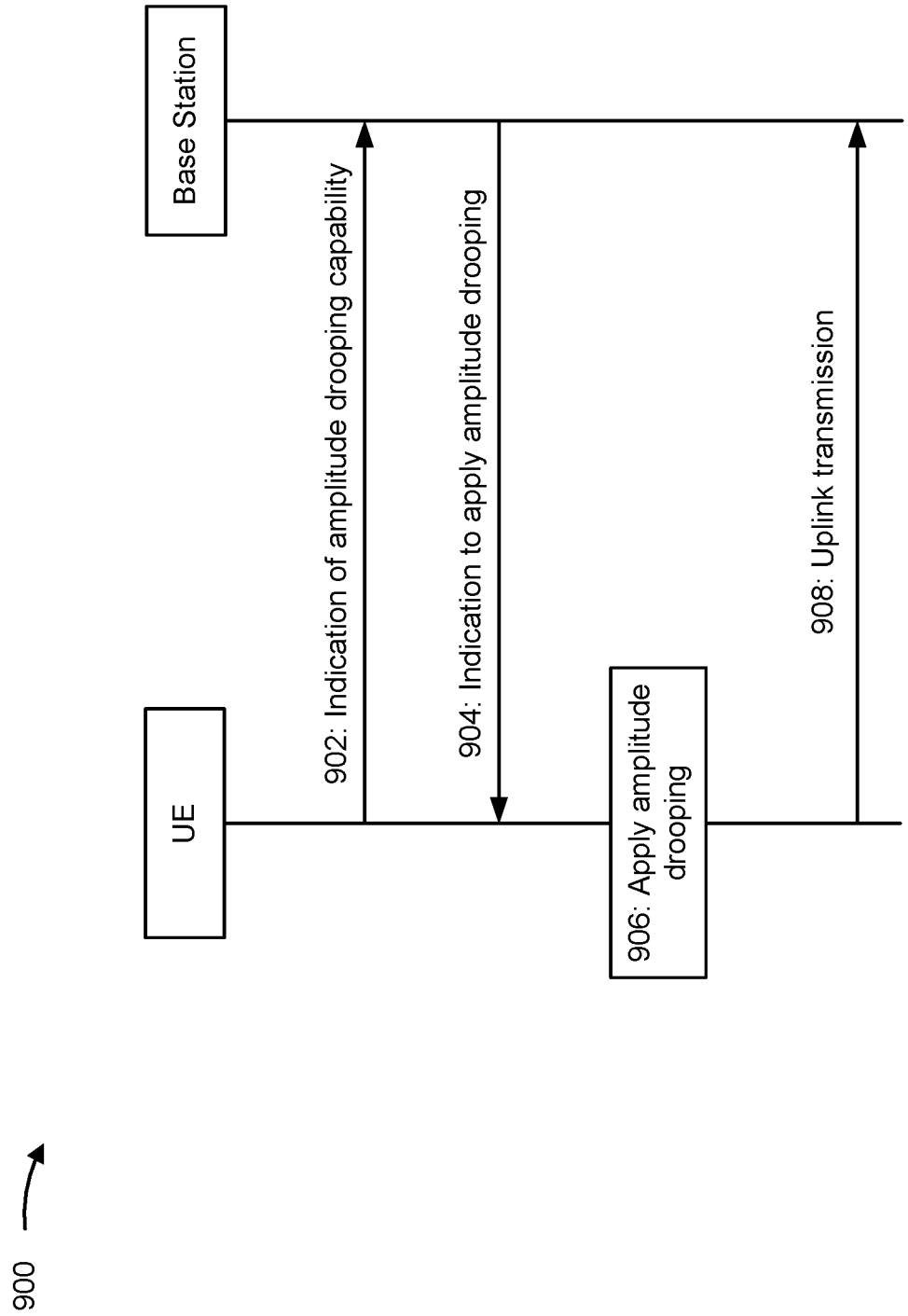
FIG. 9 is a diagram illustrating an example of applying amplitude drooping for adjacent bands, in accordance with the present disclosure.

FIG. 9 is a diagram illustrating an example 900 of applying amplitude drooping for adjacent bands, in accordance with the present disclosure. As shown in FIG. 9, example 900 includes communication between a UE (e.g., UE 120) and a base station (e.g., base station 110). In some aspects, the UE and the base station may be included in a wireless network, such as wireless network 100.

As shown by reference number 902, the UE (e.g., a full-duplex UE) may transmit, to the base station, an indication of an amplitude drooping capability. The amplitude drooping capability may indicate that the UE is capable of applying amplitude drooping. The amplitude drooping may be associated with a change in signal power within a specified measurement window. The amplitude drooping capability may involve the UE intentionally adjusting (e.g., increasing or decreasing) the amplitude drooping when the UE is associated with an uplink transmission in the uplink band that is adjacent to a downlink band in a full-duplex operation.

In some aspects, the UE may apply the amplitude drooping to reduce a self-interference at the UE for a downlink reception in the downlink band that is adjacent to the uplink band. For example, the UE may reduce an amount of amplitude drooping for the uplink band, which may reduce the signal power associated with the uplink band. As a result, an amount of self-interference on the downlink reception may be reduced.

In some aspects, the amplitude drooping capability may be with respect to a frequency band, a bandwidth, a center frequency, and/or the amplitude drooping. In some aspects, the UE may transmit the indication of the amplitude drooping capability in UCI, an uplink shared channel such as a PUSCH, or UE assistance information.

In some aspects, the UE may transmit, to the base station, an indication of amplitude drooping values that the UE may achieve for every configured bandwidth part. For example, the indication may indicate one or more amplitude drooping values associated with a first configured bandwidth part, one or more amplitude drooping values associated with a second configured bandwidth part, and so on. The amplitude drooping values may correspond to various extents of amplitude drooping that the UE may achieve, which may be different than a UE capability. In other words, the amplitude drooping value may correspond to an extent of amplitude drooping to be applied by the UE.

As shown by reference number 904, the UE may receive, from the base station, an indication to apply the amplitude drooping based at least in part on the uplink band being adjacent to the downlink band in the full-duplex operation. The base station may determine to transmit to the UE the indication to apply the amplitude drooping based at least in part on the uplink band being adjacent to the downlink band in the full-duplex operation.

In some aspects, the UE may receive the indication to apply the amplitude drooping based at least in part on the indication of the amplitude drooping capability. For example, the base station may indicate for the UE to apply one of the amplitude drooping capabilities (or amplitude drooping values) indicated by the UE. The indication to apply the amplitude drooping may be a request from the base station to the UE to apply more or less amplitude drooping, depending on the indication of the amplitude drooping capability.

In some aspects, the UE may receive the indication to apply the amplitude drooping via downlink control information (DCI), or a medium access control control element (MAC-CE). In other words, the DCI may indicate an amplitude drooping value for the UE to use when the uplink band is adjacent to the downlink band in the full-duplex operation, or the MAC-CE may indicate an amplitude drooping value for the UE to use when the uplink band is adjacent to the downlink band in the full-duplex operation.

In some aspects, the UE may apply an amplitude drooping value for an active bandwidth part, where the amplitude drooping value may be associated with a radio resource control (RRC) configuration. The UE may initially receive the RRC configuration from the base station. At a later time, the UE may receive the indication to apply the amplitude drooping, and the indication may indicate the amplitude drooping value to be applied for the active bandwidth part. In other words, the UE may apply an RRC configured amplitude drooping value for the active bandwidth part.

In some aspects, the UE may apply an amplitude drooping value based at least in part on a guard band between the downlink band and the uplink band, where the guard band may be defined based at least in part on an RRC configuration. As an example, the UE may be capable of applying one of four separate amplitude drooping values, where a first amplitude drooping value corresponds to a least amount of amplitude drooping and a fourth amplitude drooping value corresponds to a greatest amount of amplitude drooping. When the guard band between the downlink band and the uplink band is within a certain range, as defined by the RRC configuration, the UE may apply one of the four separate amplitude drooping values accordingly. As a result, the UE may implicitly apply different values of amplitude drooping based at least in part on the guard band between the downlink band and the uplink band.

As shown by reference number 906, the UE may apply the amplitude drooping based at least in part on the indication received from the base station. The UE may apply the amplitude drooping by adjusting one or more coefficients associated with an RF filtering that is applied to a signal associated with the uplink transmission. By adjusting the one or more coefficients associated with the RF filtering, the UE may intentionally increase or decrease an amplitude drooping effect. In some aspects, the UE may apply the amplitude drooping using existing hardware components of the UE, such as filters, mixers, duplexers, and/or diplexers.

Generally, the amplitude drooping is an undesirable byproduct of the RF filtering and/or a DAC/ADC frequency response. However, in this case, the UE may intentionally adjust the amplitude drooping effect by adjusting the one or more coefficients associated with the RF filtering, thereby causing reduced self-interference on the downlink band.

In some aspects, the UE may apply the amplitude drooping using techniques other than RF filtering. For example, the UE may perform other signal processing techniques and/or power allocations to obtain the amplitude drooping.

As shown by reference number 908, the UE may transmit, to the base station, an uplink transmission in the uplink band based at least in part on the amplitude drooping. The UE may transmit the uplink transmission in the uplink band based at least in part on the amplitude drooping to reduce the self-interference at the UE for the downlink reception in the downlink band that is adjacent to the uplink band. The UE may apply the amplitude drooping to adjust (e.g., increase or decrease) a signal power associated with the uplink transmission. The uplink transmission may be associated with less signal power or greater signal power, depending on the amplitude drooping that is applied. As a result, the uplink transmission may cause less self-interference on the downlink band when the uplink band is adjacent to the downlink band in the full-duplex operation. In an SBFD slot in which the uplink transmission is associated with the uplink band, applied amplitude drooping may improve the downlink reception since the uplink band and the downlink band may be adjacent to each other.

In some aspects, the UE may apply the amplitude drooping for a full-duplex slot. For example, the downlink band and the uplink band that is adjacent to the downlink band may be associated with an SBFD slot. In some aspects, the UE may apply the amplitude drooping for a half-duplex slot.

As indicated above, FIG. 9 is provided as an example. Other examples may differ from what is described with respect to FIG. 9.

Figure 10:
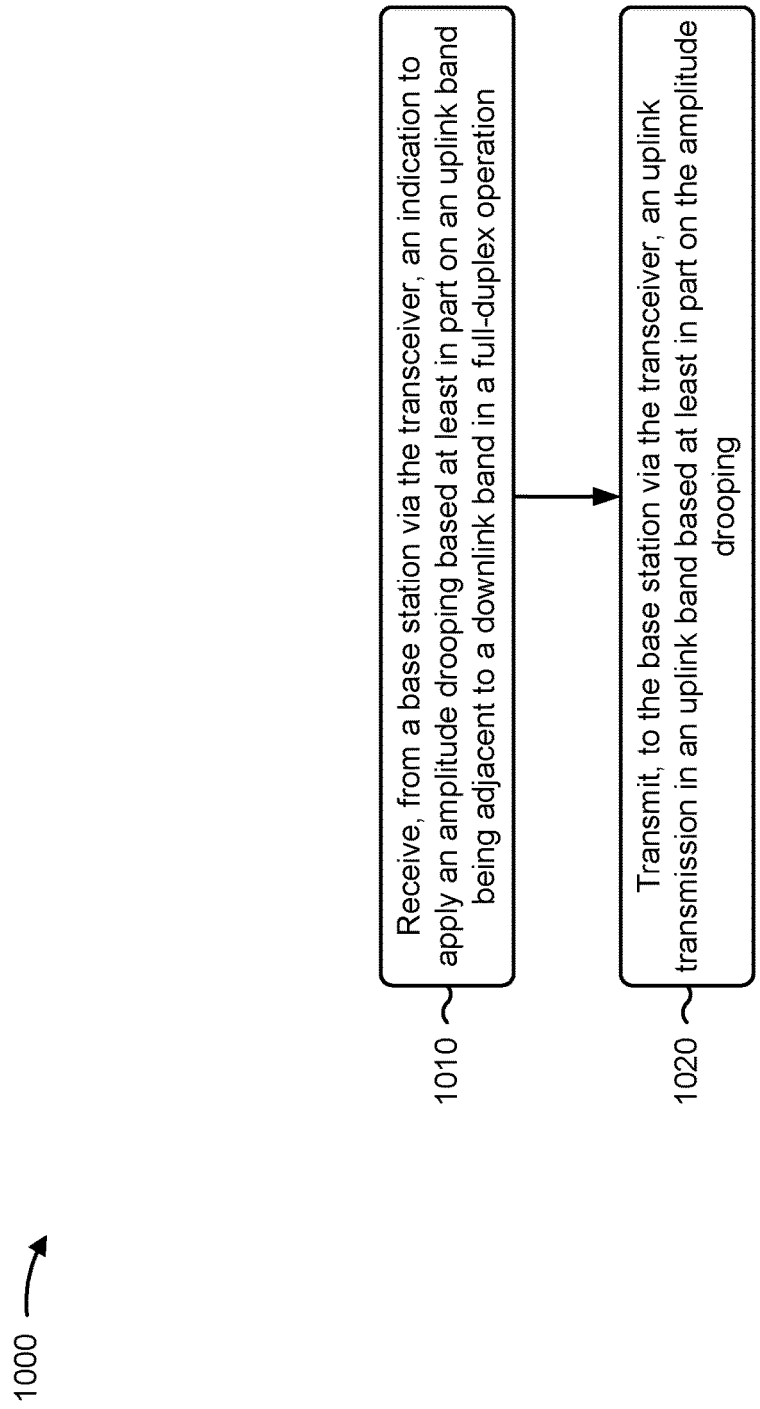
FIGS. 10-11 are diagrams illustrating example processes associated with applying amplitude drooping for adjacent bands, in accordance with the present disclosure.

FIG. 10 is a diagram illustrating an example process 1000 performed, for example, by a UE, in accordance with the present disclosure. Example process 1000 is an example where the UE (e.g., UE 120) performs operations associated with applying amplitude drooping for adjacent bands.

As shown in FIG. 10, in some aspects, process 1000 may include receiving, from a base station, an indication to apply an amplitude drooping based at least in part on an uplink band being adjacent to a downlink band in a full-duplex operation (block 1010). For example, the UE (e.g., using communication manager 140 and/or reception component 1202, depicted in FIG. 12) may receive, from a base station, an indication to apply an amplitude drooping based at least in part on an uplink band being adjacent to a downlink band in a full-duplex operation, as described above, for example, with reference to FIG. 9.

As further shown in FIG. 10, in some aspects, process 1000 may include transmitting, to the base station, an uplink transmission in the uplink band based at least in part on the amplitude drooping (block 1020). For example, the UE (e.g., using communication manager 140 and/or transmission component 1204, depicted in FIG. 12) may transmit, to the base station, an uplink transmission in the uplink band based at least in part on the amplitude drooping, as described above, as described above, for example, with reference to FIG. 9.

Process 1000 may include additional aspects, such as any single aspect or any combination of aspects described below and/or in connection with one or more other processes described elsewhere herein.

In a first aspect, the amplitude drooping is associated with a change in signal power within a specified measurement window.

In a second aspect, alone or in combination with the first aspect, process 1000 includes applying the amplitude drooping based at least in part on the indication received from the base station, and process 1000 includes applying the amplitude drooping by adjusting one or more coefficients associated with a radio frequency filtering that is applied to a signal associated with the uplink transmission.

In a third aspect, alone or in combination with one or more of the first and second aspects, the uplink transmission is transmitted in the uplink band based at least in part on the amplitude drooping to reduce a self-interference at the UE for a downlink reception in the downlink band that is adjacent to the uplink band.

In a fourth aspect, alone or in combination with one or more of the first through third aspects, process 1000 includes transmitting, to the base station via the transceiver, an indication of an amplitude drooping capability that indicates at least one amplitude drooping capability of the UE, wherein the at least one amplitude drooping capability is with respect to one or more of a frequency band, a bandwidth, a center frequency, or the amplitude drooping, and the indication to apply the amplitude drooping is responsive to the indication of the amplitude drooping capability.

In a fifth aspect, alone or in combination with one or more of the first through fourth aspects, the indication of the amplitude drooping capability is associated with a configured bandwidth part.

In a sixth aspect, alone or in combination with one or more of the first through fifth aspects, process 1000 includes transmitting the indication of the amplitude drooping capability in one of UCI, an uplink shared channel, or UE assistance information.

In a seventh aspect, alone or in combination with one or more of the first through sixth aspects, process 1000 includes receiving the indication to apply the amplitude drooping via DCI or a MAC-CE.

In an eighth aspect, alone or in combination with one or more of the first through seventh aspects, the indication to apply the amplitude drooping indicates an amplitude drooping value to be applied by the UE, and the amplitude drooping value corresponds to an extent of amplitude drooping to be applied by the UE.

In a ninth aspect, alone or in combination with one or more of the first through seventh aspects, process 1000 includes applying one of the one or more possible amplitude drooping values for an active bandwidth part, or applying the one or more possible amplitude drooping values based at least in part on a guard band between the downlink band and the uplink band.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
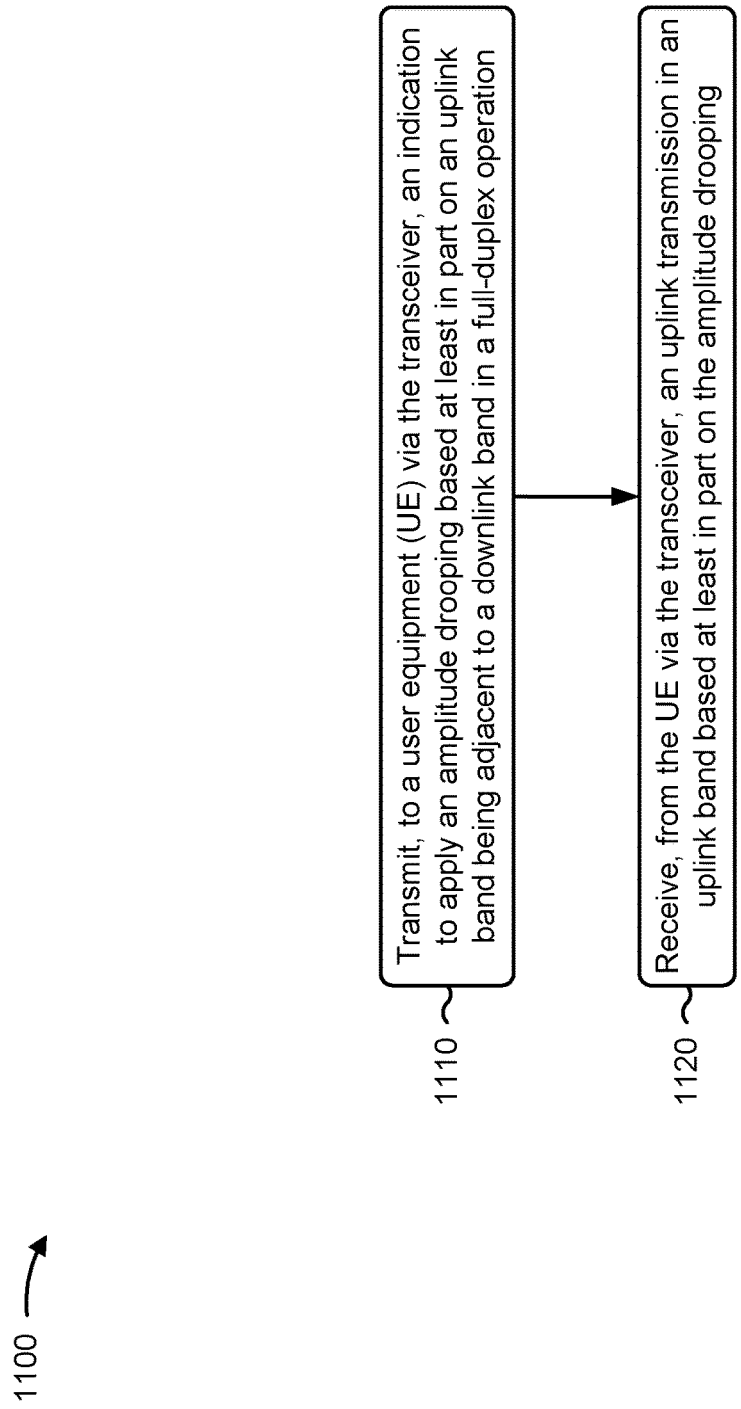

FIG. 11 is a diagram illustrating an example process 1100 performed, for example, by a base station, in accordance with the present disclosure. Example process 1100 is an example where the base station (e.g., base station 110) performs operations associated with applying amplitude drooping for adjacent bands.

As shown in FIG. 11, in some aspects, process 1100 may include transmitting, to a UE, an indication to apply an amplitude drooping based at least in part on an uplink band being adjacent to a downlink band in a full-duplex operation (block 1110). For example, the base station (e.g., using communication manager 150 and/or transmission component 1304, depicted in FIG. 13) may transmit, to a UE, an indication to apply an amplitude drooping based at least in part on an uplink band being adjacent to a downlink band in a full-duplex operation, as described above, as described above, for example, with reference to FIG. 9.

As further shown in FIG. 11, in some aspects, process 1100 may include receiving, from the UE, an uplink transmission in the uplink band based at least in part on the amplitude drooping (block 1120). For example, the base station (e.g., using communication manager 150 and/or reception component 1302, depicted in FIG. 13) may receive, from the UE, an uplink transmission in the uplink band based at least in part on the amplitude drooping, as described above, as described above, for example, with reference to FIG. 9.

Process 1100 may include additional aspects, such as any single aspect or any combination of aspects described below and/or in connection with one or more other processes described elsewhere herein.

In a first aspect, the uplink transmission is received in the uplink band based at least in part on the amplitude drooping to reduce a self-interference at the UE for a downlink reception in the downlink band that is adjacent to the uplink band.

In a second aspect, alone or in combination with the first aspect, process 1100 includes receiving, from the UE via the transceiver, an indication of an amplitude drooping capability that indicates at least one amplitude drooping capability of the UE, wherein the at least one amplitude drooping capability is with respect to one or more of a frequency band, a bandwidth, a center frequency, or the amplitude drooping, and process 1100 includes transmitting the indication to apply the amplitude drooping based at least in part on the indication of the amplitude drooping capability.

In a third aspect, alone or in combination with one or more of the first and second aspects, process 1100 includes transmitting the indication to apply the amplitude drooping via DCI or a MAC-CE.

In a fourth aspect, alone or in combination with one or more of the first through third aspects, the indication to apply the amplitude drooping indicates an amplitude drooping value to be applied by the UE, wherein the amplitude drooping value corresponds to an extent of amplitude drooping to be applied by the UE.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
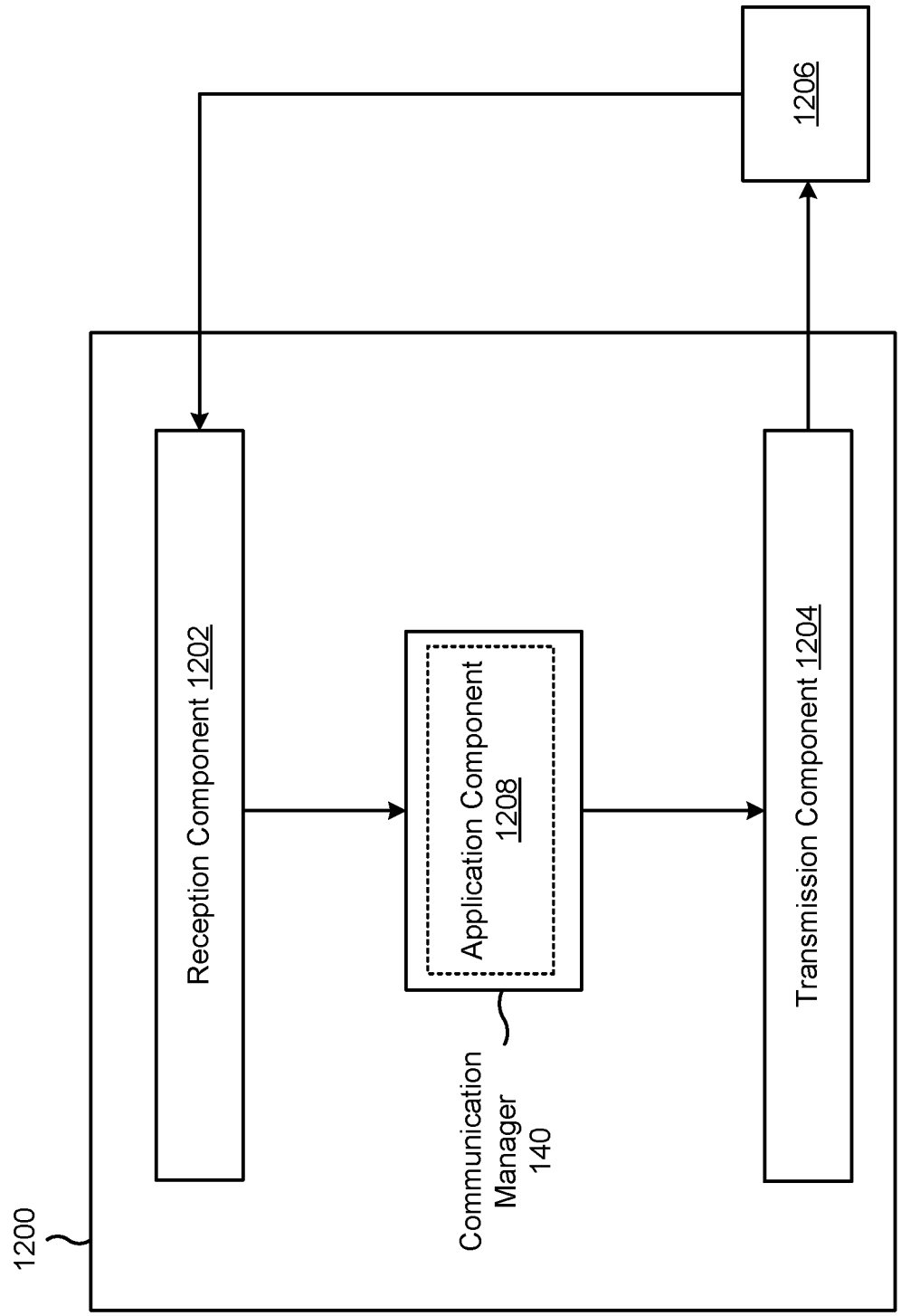
FIGS. 12-13 are diagrams of example apparatuses for wireless communication, in accordance with the present disclosure.

FIG. 12 is a diagram of an example apparatus 1200 for wireless communication. The apparatus 1200 may be a UE, or a UE may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include the communication manager 140. The communication manager 140 may include an application component 1208, among other examples.

In some aspects, the apparatus 1200 may be configured to perform one or more operations described herein in connection with FIG. 9. Additionally, or alternatively, the apparatus 1200 may be configured to perform one or more processes described herein, such as process 1000 of FIG. 10. In some aspects, the apparatus 1200 and/or one or more components shown in FIG. 12 may include one or more components of the UE described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1206. In some aspects, the reception component 1202 may include one or more antennas, a modem, a demodulator, a MIMO detector, a receive processor, a controller/processor, a memory, or a combination thereof, of the UE described in connection with FIG. 2.

The transmission component 1204 may transmit communications, such as reference signals, control information, data communications, or a combination thereof, to the apparatus 1206. In some aspects, one or more other components of the apparatus 1206 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modem, a modulator, a transmit MIMO processor, a transmit processor, a controller/processor, a memory, or a combination thereof, of the UE described in connection with FIG. 2. In some aspects, the transmission component 1204 may be co-located with the reception component 1202 in a transceiver.

The reception component 1202 may receive, from a base station, an indication to apply an amplitude drooping based at least in part on an uplink band being adjacent to a downlink band in a full-duplex operation. The transmission component 1204 may transmit, to the base station, an uplink transmission in the uplink band based at least in part on the amplitude drooping.

The application component 1208 may apply the amplitude drooping based at least in part on the indication received from the base station. The application component 1208 may apply the amplitude drooping by adjusting one or more coefficients associated with a radio frequency filtering that is applied to a signal associated with the uplink transmission. The application component 1208 may apply one of the one or more possible amplitude drooping values for an active bandwidth part. The application component 1208 may apply the one or more possible amplitude drooping values based at least in part on a guard band between the downlink band and the uplink band.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

Figure 13:
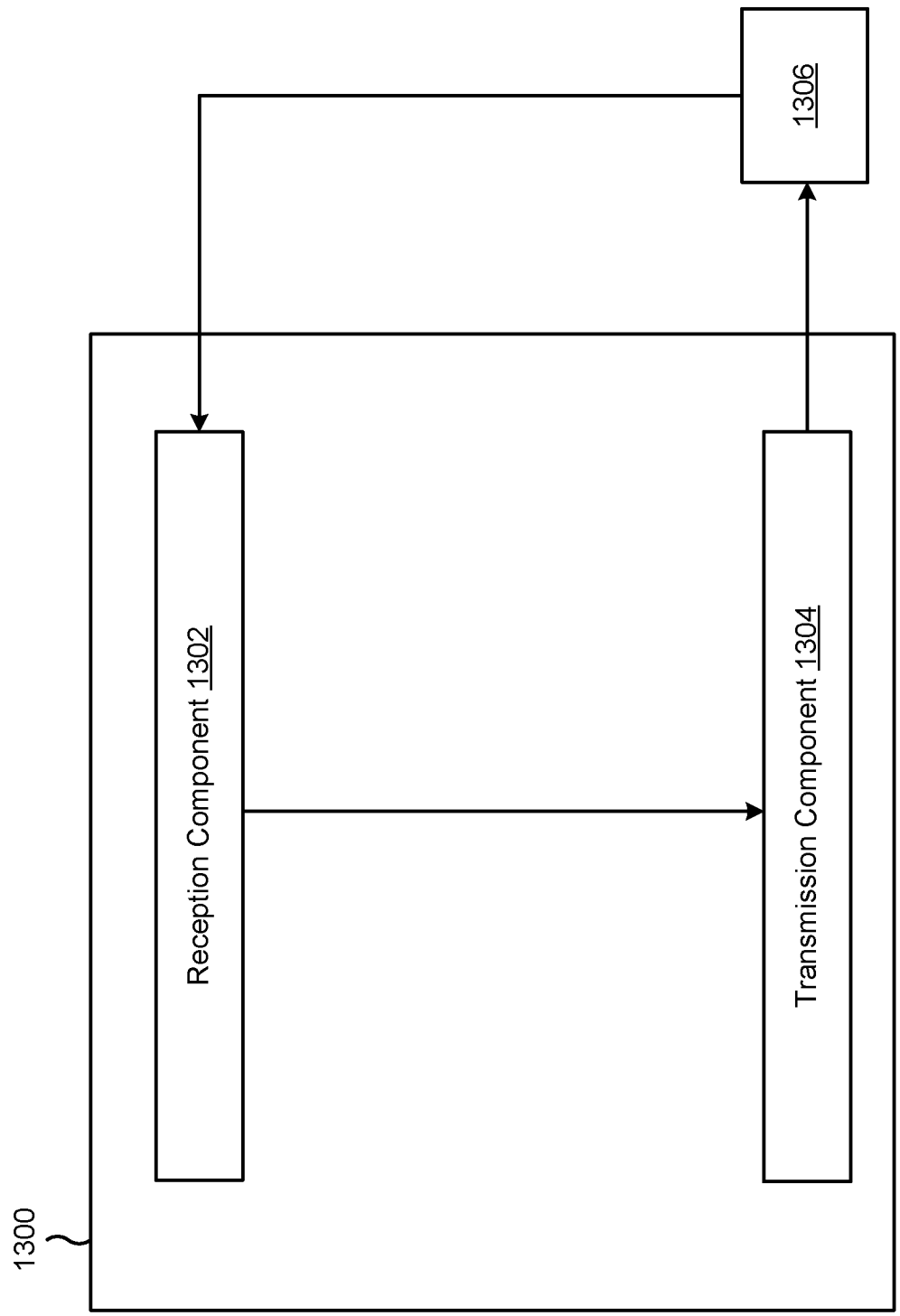

FIG. 13 is a diagram of an example apparatus 1300 for wireless communication. The apparatus 1300 may be a base station, or a base station may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304.

In some aspects, the apparatus 1300 may be configured to perform one or more operations described herein in connection with FIG. 9. Additionally, or alternatively, the apparatus 1300 may be configured to perform one or more processes described herein, such as process 1100 of FIG. 11. In some aspects, the apparatus 1300 and/or one or more components shown in FIG. 13 may include one or more components of the base station described in connection with FIG. 2. Additionally, or alternatively, one or more components shown in FIG. 13 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1306. In some aspects, the reception component 1302 may include one or more antennas, a modem, a demodulator, a MIMO detector, a receive processor, a controller/processor, a memory, or a combination thereof, of the base station described in connection with FIG. 2.

The transmission component 1304 may transmit communications, such as reference signals, control information, data communications, or a combination thereof, to the apparatus 1306. In some aspects, one or more other components of the apparatus 1306 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modem, a modulator, a transmit MIMO processor, a transmit processor, a controller/processor, a memory, or a combination thereof, of the base station described in connection with FIG. 2. In some aspects, the transmission component 1304 may be co-located with the reception component 1302 in a transceiver.

The transmission component 1304 may transmit, to a UE, an indication to apply an amplitude drooping based at least in part on an uplink band being adjacent to a downlink band in a full-duplex operation. The reception component 1302 may receive, from the UE, an uplink transmission in the uplink band based at least in part on the amplitude drooping.

The reception component 1302 may receive, from the UE, an indication of an amplitude drooping capability that indicates at least one amplitude drooping capability of the UE, wherein the at least one amplitude drooping capability is with respect to one or more of a frequency band, a bandwidth, a center frequency, or the amplitude drooping, and the indication to apply the amplitude drooping is responsive to the indication of the amplitude drooping capability.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

The following provides an overview of some Aspects of the present disclosure:

Aspect 1: A method of wireless communication performed by a user equipment (UE), comprising: receiving, from a base station, an indication to apply an amplitude drooping based at least in part on an uplink band being adjacent to a downlink band in a full-duplex operation; and transmitting, to the base station, an uplink transmission in the uplink band based at least in part on the amplitude drooping.

Aspect 2: The method of Aspect 1, wherein the amplitude drooping is associated with a change in signal power within a specified measurement window.

Aspect 3: The method of any of Aspects 1 through 2, further comprising: applying the amplitude drooping based at least in part on the indication received from the base station, wherein applying the amplitude drooping comprises adjusting one or more coefficients associated with a radio frequency filtering that is applied to a signal associated with the uplink transmission.

Aspect 4: The method of any of Aspects 1 through 3, wherein the uplink transmission is transmitted in the uplink band based at least in part on the amplitude drooping to reduce a self-interference at the UE for a downlink reception in the downlink band that is adjacent to the uplink band.

Aspect 5: The method of any of Aspects 1 through 4, further comprising: transmitting, to the base station via the transceiver, an indication of an amplitude drooping capability that indicates at least one amplitude drooping capability of the UE, wherein the at least one amplitude drooping capability is with respect to one or more of a frequency band, a bandwidth, a center frequency, or the amplitude drooping, and wherein the indication to apply the amplitude drooping is responsive to the indication of the amplitude drooping capability.

Aspect 6: The method of Aspect 5, wherein the indication of the amplitude drooping capability is associated with a configured bandwidth part.

Aspect 7: The method of Aspect 5, wherein transmitting the indication of the amplitude drooping capability comprises transmitting the indication of the amplitude drooping capability in one of uplink control information, an uplink shared channel, or UE assistance information.

Aspect 8: The method of any of Aspects 1 through 7, wherein receiving the indication to apply the amplitude drooping comprises receiving the indication to apply the amplitude drooping via downlink control information or a medium access control control element.

Aspect 9: The method of any of Aspects 1 through 8, wherein the indication to apply the amplitude drooping indicates an amplitude drooping value to be applied by the UE, wherein the amplitude drooping value corresponds to an extent of amplitude drooping to be applied by the UE.

Aspect 10: The method of any of Aspects 1 through 9, further comprising: applying an amplitude drooping value for an active bandwidth part, wherein the amplitude drooping value is associated with a radio resource control (RRC) configuration; or applying an amplitude drooping value based at least in part on a guard band between the downlink band and the uplink band, wherein the guard band is defined based at least in part on the RRC configuration.

Aspect 11: A method of wireless communication performed by a base station, comprising: transmitting, to a user equipment (UE), an indication to apply an amplitude drooping based at least in part on an uplink band being adjacent to a downlink band in a full-duplex operation; and receiving, from the UE, an uplink transmission in the uplink band based at least in part on the amplitude drooping.

Aspect 12: The method of Aspect 11, wherein the uplink transmission is received in the uplink band based at least in part on the amplitude drooping to reduce a self-interference at the UE for a downlink reception in the downlink band that is adjacent to the uplink band.

Aspect 13: The method of any of Aspects 11 through 12, further comprising: receiving, from the UE via the transceiver, an indication of an amplitude drooping capability that indicates at least one amplitude drooping capability of the UE, wherein the at least one amplitude drooping capability is with respect to one or more of a frequency band, a bandwidth, a center frequency, or the amplitude drooping, and receiving the indication to apply the amplitude drooping is based at least in part on the indication of the amplitude drooping capability.

Aspect 14: The method of any of Aspects 11 through 13, wherein transmitting the indication to apply the amplitude drooping comprises transmitting the indication to apply the amplitude drooping via downlink control information or a medium access control control element.

Aspect 15: The method of any of Aspects 11 through 14, wherein the indication to apply the amplitude drooping indicates an amplitude drooping value to be applied by the UE, wherein the amplitude drooping value corresponds to an extent of amplitude drooping to be applied by the UE.

Aspect 16: An apparatus for wireless communication at a device, comprising a processor; memory coupled with the processor; and instructions stored in the memory and executable by the processor to cause the apparatus to perform the method of one or more of Aspects 1-10.

Aspect 17: A device for wireless communication, comprising a memory and one or more processors coupled to the memory, the one or more processors configured to perform the method of one or more of Aspects 1-10.

Aspect 18: An apparatus for wireless communication, comprising at least one means for performing the method of one or more of Aspects 1-10.

Aspect 19: A non-transitory computer-readable medium storing code for wireless communication, the code comprising instructions executable by a processor to perform the method of one or more of Aspects 1-10.

Aspect 20: A non-transitory computer-readable medium storing a set of instructions for wireless communication, the set of instructions comprising one or more instructions that, when executed by one or more processors of a device, cause the device to perform the method of one or more of Aspects 1-10.

Aspect 21: An apparatus for wireless communication at a device, comprising a processor; memory coupled with the processor; and instructions stored in the memory and executable by the processor to cause the apparatus to perform the method of one or more of Aspects 11-15.

Aspect 22: A device for wireless communication, comprising a memory and one or more processors coupled to the memory, the one or more processors configured to perform the method of one or more of Aspects 11-15.

Aspect 23: An apparatus for wireless communication, comprising at least one means for performing the method of one or more of Aspects 11-15.

Aspect 24: A non-transitory computer-readable medium storing code for wireless communication, the code comprising instructions executable by a processor to perform the method of one or more of Aspects 11-15.

Aspect 25: A non-transitory computer-readable medium storing a set of instructions for wireless communication, the set of instructions comprising one or more instructions that, when executed by one or more processors of a device, cause the device to perform the method of one or more of Aspects 11-15.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
    a memory;
    a transceiver; and
    one or more processors, coupled to the memory, configured to:
        receive, from a base station via the transceiver, an indication to apply amplitude drooping to change a signal power of a signal based at least in part on an uplink band being adjacent to a downlink band in a full-duplex operation, the amplitude drooping changing the signal power due to at least one of radio frequency filtering applied to the signal or a frequency response of a digital or analog conversion; and
        transmit, to the base station via the transceiver, an uplink transmission in the uplink band based at least in part on the amplitude drooping.

2. The apparatus of claim 1, wherein the amplitude drooping is associated with the change in the signal power within a specified measurement window.

3. The apparatus of claim 1, wherein the one or more processors are further configured to:
    apply the amplitude drooping based at least in part on the indication received from the base station, the one or more processors configured to apply the amplitude drooping by adjusting one or more coefficients associated with the radio frequency filtering applied to the signal, the signal being associated with the uplink transmission.

4. The apparatus of claim 1, wherein the uplink transmission is transmitted in the uplink band based at least in part on the amplitude drooping to reduce a self-interference at the UE for a downlink reception in the downlink band that is adjacent to the uplink band.

5. The apparatus of claim 1, wherein the one or more processors are further configured to:
    transmit, to the base station via the transceiver, an indication of an amplitude drooping capability that indicates at least one amplitude drooping capability of the UE, wherein the at least one amplitude drooping capability is with respect to one or more of a frequency band, a bandwidth, a center frequency, or the amplitude drooping, and wherein the indication to apply the amplitude drooping is responsive to the indication of the amplitude drooping capability.

6. The apparatus of claim 5, wherein the indication of the amplitude drooping capability is associated with a configured bandwidth part.

7. The apparatus of claim 5, wherein the one or more processors, to transmit the indication of the amplitude drooping capability, are configured to transmit the indication of the amplitude drooping capability in one of uplink control information, an uplink shared channel, or UE assistance information.

8. The apparatus of claim 1, wherein the one or more processors, to receive the indication to apply the amplitude drooping, are configured to receive the indication to apply the amplitude drooping via downlink control information or a medium access control control element.

9. The apparatus of claim 1, wherein the indication to apply the amplitude drooping indicates an amplitude drooping value to be applied by the UE, wherein the amplitude drooping value corresponds to an extent of amplitude drooping to be applied by the UE.

10. The apparatus of claim 1, wherein the one or more processors are further configured to:
    apply an amplitude drooping value for an active bandwidth part, wherein the amplitude drooping value is associated with a radio resource control (RRC) configuration; or
    apply an amplitude drooping value based at least in part on a guard band between the downlink band and the uplink band, wherein the guard band is defined based at least in part on the RRC configuration.

11. An apparatus for wireless communication at a base station, comprising:
- a memory;
- a transceiver; and
- one or more processors, coupled to the memory, configured to:
  - transmit, to a user equipment (UE) via the transceiver, an indication to apply amplitude drooping to change a signal power of a signal based at least in part on an uplink band being adjacent to a downlink band in a full-duplex operation, the amplitude drooping changing the signal power due to at least one of radio frequency filtering applied to the signal or a frequency response of a digital or analog conversion; and
  - receive, from the UE via the transceiver, an uplink transmission in the uplink band based at least in part on the amplitude drooping.

12. The apparatus of claim 11, wherein the uplink transmission is received in the uplink band based at least in part on the amplitude drooping to reduce a self-interference at the UE for a downlink reception in the downlink band that is adjacent to the uplink band.

13. The apparatus of claim 11, wherein the one or more processors are further configured to:
- receive, from the UE via the transceiver, an indication of an amplitude drooping capability that indicates at least one amplitude drooping capability of the UE, wherein the at least one amplitude drooping capability is with respect to one or more of a frequency band, a bandwidth, a center frequency, or the amplitude drooping, and wherein the one or more processors, to transmit the indication to apply the amplitude drooping, are configured to transmit the indication to apply the amplitude drooping based at least in part on the indication of the amplitude drooping capability.

14. The apparatus of claim 11, wherein the one or more processors, to transmit the indication to apply the amplitude drooping, are configured to transmit the indication to apply the amplitude drooping via downlink control information or a medium access control control element.

15. The apparatus of claim 11, wherein the indication to apply the amplitude drooping indicates an amplitude drooping value to be applied by the UE, wherein the amplitude drooping value corresponds to an extent of amplitude drooping to be applied by the UE.

16. A method of wireless communication performed by a user equipment (UE), comprising:
- receiving, from a base station, an indication to apply amplitude drooping to change a signal power of a signal based at least in part on an uplink band being adjacent to a downlink band in a full-duplex operation, the amplitude drooping changing the signal power due to at least one of radio frequency filtering applied to the signal or a frequency response of a digital or analog conversion; and
- transmitting, to the base station, an uplink transmission in the uplink band based at least in part on the amplitude drooping.

17. The method of claim 16, wherein the amplitude drooping is associated with the change in the signal power within a specified measurement window.

18. The method of claim 16, further comprising:
- applying the amplitude drooping based at least in part on the indication received from the base station, wherein applying the amplitude drooping comprises adjusting one or more coefficients associated with the radio frequency filtering applied to the signal, the signal being associated with the uplink transmission.

19. The method of claim 16, wherein the uplink transmission is transmitted in the uplink band based at least in part on the amplitude drooping to reduce a self-interference at the UE for a downlink reception in the downlink band that is adjacent to the uplink band.

20. The method of claim 16, further comprising:
- transmitting, to the base station, an indication of an amplitude drooping capability that indicates at least one amplitude drooping capability of the UE, wherein the at least one amplitude drooping capability is with respect to one or more of a frequency band, a bandwidth, a center frequency, or the amplitude drooping, and wherein the indication to apply the amplitude drooping is responsive to the indication of the amplitude drooping capability.

21. The method of claim 20, wherein the indication of the amplitude drooping capability is associated with a configured bandwidth part.

22. The method of claim 20, wherein transmitting the indication of the amplitude drooping capability comprises transmitting the indication of the amplitude drooping capability in one of uplink control information, an uplink shared channel, or UE assistance information.

23. The method of claim 16, wherein receiving the indication to apply the amplitude drooping comprises receiving the indication to apply the amplitude drooping via downlink control information or a medium access control control element.

24. The method of claim 16, wherein the indication to apply the amplitude drooping indicates an amplitude drooping value to be applied by the UE, wherein the amplitude drooping value corresponds to an extent of amplitude drooping to be applied by the UE.

25. The method of claim 16, further comprising:
- applying an amplitude drooping value for an active bandwidth part, wherein the amplitude drooping value is associated with a radio resource control (RRC) configuration; or
- applying an amplitude drooping value based at least in part on a guard band between the downlink band and the uplink band, wherein the guard band is defined based at least in part on the RRC configuration.

26. A method of wireless communication performed by a base station, comprising:
- transmitting, to a user equipment (UE), an indication to apply amplitude drooping to change a signal power of a signal based at least in part on an uplink band being adjacent to a downlink band in a full-duplex operation, the amplitude drooping changing the signal power due to at least one of radio frequency filtering applied to the signal or a frequency response of a digital or analog conversion; and
- receiving, from the UE, an uplink transmission in the uplink band based at least in part on the amplitude drooping.

27. The method of claim 26, wherein the uplink transmission is received in the uplink band based at least in part on the amplitude drooping to reduce a self-interference at the UE for a downlink reception in the downlink band that is adjacent to the uplink band.

28. The method of claim 26, further comprising:
- receiving, from the UE, an indication of an amplitude drooping capability that indicates at least one amplitude drooping capability of the UE, wherein the at least one amplitude drooping capability is with respect to one or more of a frequency band, a bandwidth, a center frequency, or the amplitude drooping, and receiving the indication to apply the amplitude drooping is based at least in part on the indication of the amplitude drooping capability.

29. The method of claim 26, wherein transmitting the indication to apply the amplitude drooping comprises transmitting the indication to apply the amplitude drooping via downlink control information or a medium access control control element.

30. The method of claim 26, wherein the indication to apply the amplitude drooping indicates an amplitude drooping value to be applied by the UE wherein the amplitude drooping value corresponds to an extent of amplitude drooping to be applied by the UE.

* * * * *